(12) United States Patent
Seaman, II et al.

(10) Patent No.: US 8,996,606 B2
(45) Date of Patent: Mar. 31, 2015

(54) WEB SERVICE ARCHITECTURE FOR DYNAMIC RULES TABLE GENERATION

(75) Inventors: Robert A. M. Seaman, II, Mountain View, CA (US); Jonathan Fan, San Mateo, CA (US); Yi Chang, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 329 days.

(21) Appl. No.: 12/254,770

(22) Filed: Oct. 20, 2008

(65) Prior Publication Data
US 2009/0106398 A1 Apr. 23, 2009

Related U.S. Application Data

(60) Provisional application No. 60/981,446, filed on Oct. 19, 2007.

(51) Int. Cl.
*G06F 15/16* (2006.01)
*G06Q 30/06* (2012.01)

(52) U.S. Cl.
CPC ............ *G06Q 30/06* (2013.01); *G06Q 30/0601* (2013.01)
USPC ....................................................... 709/203

(58) Field of Classification Search
CPC .... G06Q 30/06; G06Q 30/0601; G06Q 30/00
USPC .................. 709/203, 201, 219, 217
See application file for complete search history.

(56) References Cited

U.S. PATENT DOCUMENTS

| | | | |
|---|---|---|---|
| 5,717,866 A | 2/1998 | Naftzger | 705/14.38 |
| 5,774,670 A * | 6/1998 | Montulli | 709/227 |
| 5,926,525 A | 7/1999 | Kim | 379/88.33 |
| 5,968,110 A * | 10/1999 | Westrope et al. | 705/26.81 |
| 6,917,922 B1 | 7/2005 | Bezos et al. | 705/26.81 |
| 6,985,905 B2 | 1/2006 | Prompt et al. | 707/829 |
| 7,003,722 B2 | 2/2006 | Rothchiller et al. | 715/212 |
| 2001/0011241 A1* | 8/2001 | Nemzow | 705/35 |
| 2001/0014103 A1* | 8/2001 | Burns et al. | 370/429 |
| 2002/0107761 A1 | 8/2002 | Kark et al. | 705/27 |

(Continued)

OTHER PUBLICATIONS

Commercenet, Federal Agencies, Technology Vendors, and Suppliers Demonstrate New Technologies for Tying Together Independent, Proprietary Catalogs, Mar. 15, 2000, PR Newswire; http://search,proquest.com/printviewfile?accountid=14753; pp. 2-5.

(Continued)

*Primary Examiner* — William Goodchild
(74) *Attorney, Agent, or Firm* — Campbell Stephenson LLP (57) ABSTRACT

Various systems and methods for providing access to a dynamically generated rules table as a Web Service are disclosed. One method involves receiving a Web Service request from a requester and then dynamically generating a rules table, in response to receipt of the Web Service request. Dynamically generating the rules table includes accessing one or more matrices that store information associated with multiple different rules tables. For example, dynamic generation of the rules table can involve accessing a dimension matrix that stores information identifying one or more input criteria and one or more results included in the rules table, selecting information from a rules matrix based upon the criteria and results identified by the dimension matrix, and then storing the selected information from the rules matrix in the rules table.

22 Claims, 6 Drawing Sheets

(56) References Cited

U.S. PATENT DOCUMENTS

| | | | |
|---|---|---|---|
| 2002/0133510 A1 | 9/2002 | Lau | 1/1 |
| 2003/0004895 A1 | 1/2003 | Nuttall et al. | 705/67 |
| 2003/0023963 A1 | 1/2003 | Birkholz et al. | 717/172 |
| 2003/0088573 A1* | 5/2003 | Stickler | 707/100 |
| 2004/0006516 A1 | 1/2004 | Anagol-Subbarao | 705/26 |
| 2004/0015443 A1* | 1/2004 | McCoy | 705/50 |
| 2004/0054603 A1 | 3/2004 | Clinesmith et al. | 705/26 |
| 2004/0064351 A1* | 4/2004 | Mikurak | 705/7 |
| 2004/0133656 A1* | 7/2004 | Butterworth et al. | 709/219 |
| 2005/0044197 A1 | 2/2005 | Lai | 709/223 |
| 2005/0114270 A1 | 5/2005 | Hind et al. | 705/64 |
| 2005/0131759 A1 | 6/2005 | Agrawal et al. | 705/14 |
| 2005/0149547 A1 | 7/2005 | Wight et al. | 707/101 |
| 2005/0198394 A1 | 9/2005 | Waldorf et al. | 709/246 |
| 2006/0011720 A1 | 1/2006 | Call | 235/383 |
| 2006/0122942 A1 | 6/2006 | Nuttall et al. | 705/59 |
| 2006/0136593 A1 | 6/2006 | Silky et al. | 709/297 |
| 2006/0143079 A1 | 6/2006 | Basak et al. | 705/14 |
| 2006/0167988 A1 | 7/2006 | Barck et al. | 709/203 |
| 2006/0168226 A1 | 7/2006 | Miller et al. | 709/226 |
| 2006/0205420 A1 | 9/2006 | Bibr et al. | 455/466 |
| 2007/0083459 A1 | 4/2007 | Eubanks | 705/38 |
| 2007/0150370 A1* | 6/2007 | Staib et al. | 705/26 |
| 2008/0133303 A1 | 6/2008 | Singh et al. | 705/8 |
| 2009/0106128 A1 | 4/2009 | Varmaraja et al. | 705/26.1 |
| 2009/0106129 A1 | 4/2009 | Varmaraja et al. | 705/26.1 |
| 2009/0106287 A1 | 4/2009 | Lewis | 1/1 |
| 2009/0106402 A1 | 4/2009 | Varmaraja et al. | 709/220 |
| 2010/0094716 A1 | 4/2010 | Ganesan et al. | 705/26 |

OTHER PUBLICATIONS

Zimmermann, Olaf et al., "Service-Oriented Architecture and Business Process Choreography in an Order Management Scenario: Rationale, Concepts, Lessons Learned," OOPSLA '05, Oct. 16-20, 2005, San Diego, CA, pp.-12.

* cited by examiner

| Name Matrix 360 |
|---|
| Name 362 |
| |

| Dimension Matrix 370 | | | |
|---|---|---|---|
| Account Type 372 | State 374 | Adj Type 376 | Adj Amt 378 |
| | | | |

Rules Matrix 380

| Name 387 | Account Type 381 | Region 382 | State 383 | Quantity 384 | Adj Type 385 | Adj Amt 386 |
|---|---|---|---|---|---|---|
| Name1 | Gold | Central | TX | | % Discount | 10 |
| Name1 | Gold | Central | OK | | % Discount | 9.5 |
| Name1 | Silver | Central | TX | | % Discount | 7.5 |
| Name1 | Silver | Central | OK | | Price | $100 |
| Name2 | Gold | Southwest | | <100 | % Discount | 12 |
| Name2 | Silver | Southwest | | <100 | % Discount | 11 |
| Name3 | Platinum | Asia | | | Price | $110 |

Dynamically Generated Rules Table 500

| Account Type 381 | State 383 | Adj Type 385 | Adj Amt 386 |
|---|---|---|---|
| Gold | TX | % Discount | 10 |
| Gold | OK | % Discount | 9.5 |
| Silver | TX | % Discount | 7.5 |
| Silver | OK | Price | $100 |

FIG. 6

WEB SERVICE ARCHITECTURE FOR DYNAMIC RULES TABLE GENERATION

RELATED APPLICATIONS

This application claims the benefit, under 35 U.S.C. §119 (e), of U.S. Provisional Application No. 60/981,446, filed Oct. 19, 2007, entitled "Web Service Architecture for Order Management System," and naming Muralidhara Varmaraja, Meng Feng, Hang Lu, Ashish Singhal, Eugene Chikovani, Mark D. Lewis, Ying Wang, Re Lai, Robert A. M. Seaman, II, Jonathan Fan, and Yi Chang as inventors. The above-referenced application is hereby incorporated by reference herein in its entirety as if completely and fully set forth herein.

FIELD OF THE INVENTION

This invention relates to rules tables and, more particularly, to dynamically generating rules tables.

BACKGROUND

Historically, companies have tended to have a number of policies regarding, for example, how those companies price their products when sold in various contexts. Such policies can include policies for differentiating price based upon characteristics of the customer making the purchase, policies for providing price breaks based on volume purchased, policies for establishing a maximum discounting level for certain sales roles, and the like. These policies are typically established and managed independently for each separate sales channel in spreadsheets. Thus, the policies were unlikely to be consistently propagated among the sales channels, which in turn led to inconsistent pricing, maverick discounting by sales teams, and margin erosion.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

System Overview

Figure 1:
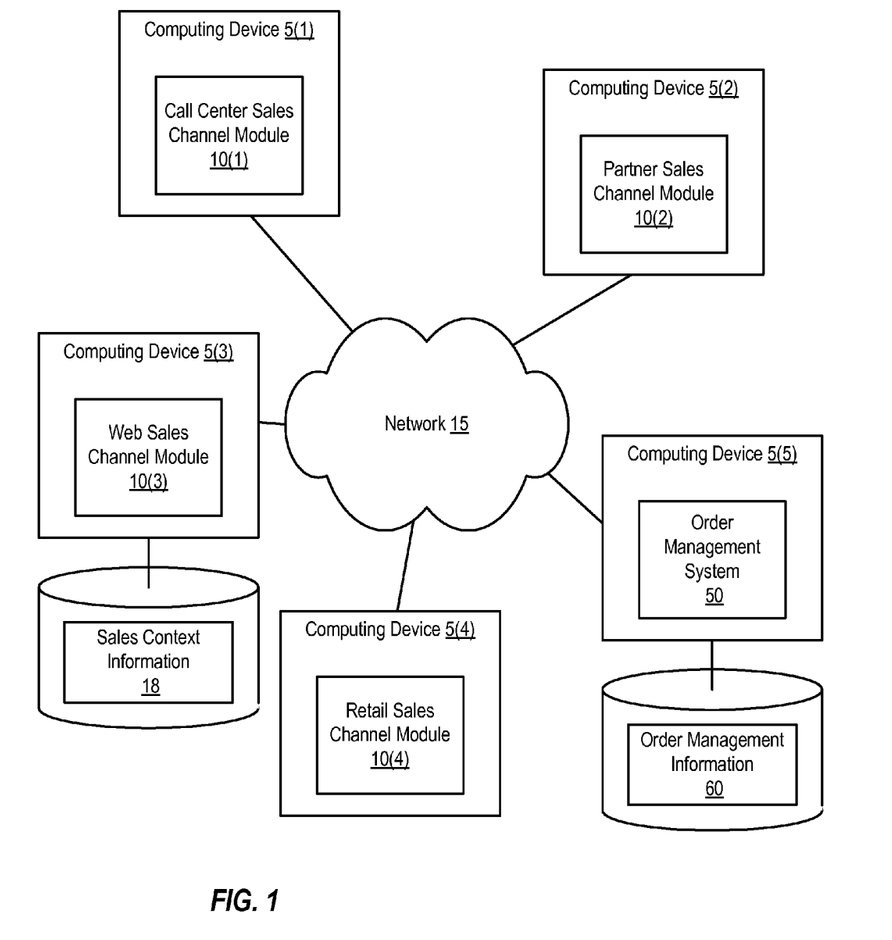
FIG. 1 is a block diagram of a system that includes an order management system that provides order management functionality as a Web Service, according to one embodiment of the present invention.

FIG. 1 is a block diagram of a system that includes an order management system that provides various order management functions as Web Services. As shown, the system includes several computing devices 5(1), 5(2), 5(3), 5(4), and 5(5). Each computing device can include one or more servers, personal computers, cell phones, laptop computers, personal digital assistants, or other computing devices that are capable of implementing a sales channel module or order management system in hardware and/or software.

Computing device 5(5) implements an order management system 50. Order management system 50 provides functionality that can be used to, for example, define a sales context, manage product and/or catalog information, proving pricing information, and/or analyze customer behavior. Order management system 50 can also provide functionality to capture orders, orchestrate orders, and/or fulfill customer orders. While FIG. 1 shows order management system 50 being implemented on a single computing device 5(5), it is noted that in many implementations, the functionality of order management system 50 may be distributed among several such computing devices.

Order management system 50 can provide access to, generate, and/or maintain order management information 60. Order management information 60 can include pricing information, rules information (e.g., for use in determining pricing, product configurations, product eligibility, and the like), catalog and product information, and other appropriate information.

Computing devices 5(1), 5(2), 5(3), and 5(4) each implement a respective sales channel module. These sales channel modules are used to facilitate respective sales channels. In particular, call center sales channel module 10(1), which is implemented on computing device 5(1), is used to facilitate a call center sales channel. In one embodiment, call center sales channel module 10(1) provides a user interface to a customer service agent working in a call center, allowing the customer service agent to use functionality provided by order management system 50.

Similarly, computing device 5(2) implements a partner sales channel module 10(2). Partner sales channel module 10(2) can facilitate sales (via order management system 50) of one client's products and/or services by another client, which is referred to as a partner.

Computing device 5(3) implements a Web sales channel module 10(3). Web sales channel module 10(3) facilitates orders over the Internet. For example, Web sales channel module 10(3) can include a Web server that allows users to browse Web pages. Web sales channel module 10(3) can interact with order management system 50 in order to obtain information to display in the Web pages being supplied to users.

Computing device 5(4) implements a retail sales channel module 10(4). Retail sales channel module 10(4) can operate in a retail environment. Retail sales channel module 10(4) can provide sales clerks and/or customers with access to the functionality provided by order management system 50 in order to facilitate sales and ordering in the retail environment.

Computing devices 5(1)-5(5) are coupled by a network 15. Network 15 can include one or more Local Area Networks (LANs) and/or Wide Area Networks (WANs) such as the Internet. Network 15 can be implemented using various wireless links, coaxial cables, fiber optic cables, and the like. It is noted that in alternative embodiments, instead of being implemented on separate computing devices from each other and from order management system 50, one or more sales channel modules can be implemented on the same computing device as each other or on the same computing device as all or part of order management system 50.

Each sales channel module 10(1), 10(2), 10(3), and 10(4) can thus interact with order management system 50 in order to facilitate sales and orders via a particular sales channel. Sales channel modules 10(1), 10(2), 10(3), and 10(4) can be implemented in a variety of different ways, using various different types of applications. For example, call center sales channel module 10(1) can be a mainframe order entry system, while partner sales channel module 10(2) can be implemented using an application such as Siebel™ Business Applications software, available from Oracle Corporation of Redwood Shores, Calif., or Microsoft™ Sharepoint Server, available from Microsoft Corporation of Redmond, Wash. In general, each sales channel module may be implemented differently than each other sales channel module.

Each sales channel module can also maintain sales context information, such as sales context information 18 maintained by Web sales channel module 10(3). Such sales context information can include shopping cart information (e.g., for a Web sales channel), customer identifiers or other information (e.g., such as a prior order history) associated with a customer, and the like.

As briefly noted above, order management system 50 provides order management functionality as a Web Service. A Web Service is a discrete piece of business logic that is accessible via Internet protocols. Such a Web Service can be specified using Web Services Description Language (WSDL). In particular, WSDL is a format, based in eXtensible Markup Language (XML), for defining a Web Service interface. WSDL can be used to specify the endpoints, location, protocol binding, operations, parameters, and/or data types associated with a Web Service.

The organization that creates order management system 50 can generate a WSDL document (e.g., an XML document complying with WSDL) that describes the Web Service(s) provided by order management system 50. For each Web Service, the WSDL document can describe the operations provided by the Web Service, the input and output message structures for each operation, and the mechanism used to contact the Web Service.

Web Services are accessed using an XML-based transport protocol such as Service Oriented Architecture Protocol (SOAP). In particular, Web Service requests and responses (which are messages that comply with a particular Web Service's WSDL file, and which can also be referred to as Web Service signatures) can be transported via SOAP.

Using Web Services to access order management functionality allows the order management functionality to be decoupled from the sales channel module accessing the order management functionality. Accordingly, each different sales channel module can be implemented differently (and independently), so long as the resulting sales channel modules are able to request Web Services. Accordingly, a given sales channel module can be implemented whatever technology best suits the needs of a particular sales channel. Furthermore, the technology used to implement a particular sales channel module can be modified without necessitating modifications to the underlying order management system. Similarly, the particular software modules used to implement the order management system's functionality can be modified without necessitating changes in the sales channel modules that access that functionality.

Furthermore, each sales channel module 10(1)-10(4) can access the same order management functionality by accessing the order management functionality as a Web Service. Accordingly, the same underlying business logic, workflows (e.g., formed by linking two or more business logic components together to perform a particular business task), and order management information can be used to support multiple sales channels. This allows a consistent user experience (in terms of available products, pricing, discounting, and the like) to be provided across multiple different sales channels. Furthermore, whenever changes need to be made (e.g., to reflect new products, new pricing, and the like), the changes can be made just once to the underlying order management system 50. The updated order management system 50 will then return the updated service or information to each of the different sales channels.

Figure 2:
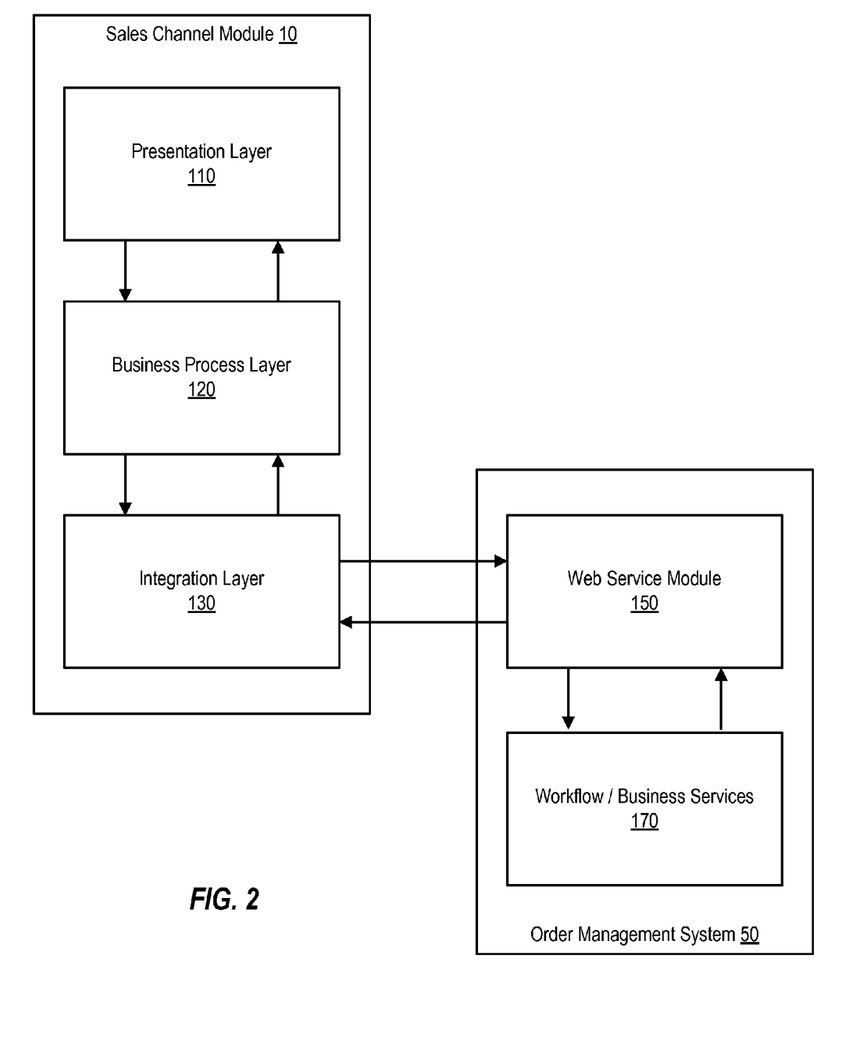
FIG. 2 is a block diagram of the Web Services interface between a sales channel module and an order management system, according to one embodiment of the present invention.

FIG. 2 is a block diagram of the Web Services interface between a sales channel module and an order management system. In this example, a sales channel module 10 (e.g., one of sales channel modules 10(1)-10(4) of FIG. 1) is coupled to communicate with an order management system 50. In one embodiment, sales channel module 10 is implemented in a container or application server (e.g., a Java 2 Platform, Enterprise Edition (J2EE)™ container), and order management system 50 can be implemented in a different container or application server.

Sales channel module 10 includes a presentation layer 110 (e.g., used to provide a user interface), a business process layer 120 (e.g., used to implement workflows or business services), and an integration layer 130. Integration layer 130 includes a Web Service requester agent that is configured to request Web Services provided by order management system 50 by sending Web Service requests via SOAP (or any other appropriate protocol).

Order management system 50 includes a Web Service module 150, which includes a Web service provider agent that is configured to receive Web Service requests sent by sales channel module 10 and to send responsive Web Service requests back to sales channel module 10. Web Service module 150 can also transform Web Service requests into property sets that can be processed by workflow and/or business services 170. Similarly, Web Service module 150 can transform property sets generated by workflow and/or business services 170 into Web Service responses and then send those Web Service responses to the appropriate sales channel module.

Workflow and/or business services 170 include various modules for providing workflows and business services. For example, such modules can include a module that provides a pricing workflow, a module that provides product configuration functionality, a module that provides access to catalog and product information, and the like. Workflow and/or business services 170 can operate on property sets provided by Web Service module 150, modify and/or access order management information (e.g., order management information 60 of FIG. 1), and return results (again in the form of property sets) to Web Service module 150.

Accessing Dynamically-Generated Rules Tables as a Web Service

Figure 3:
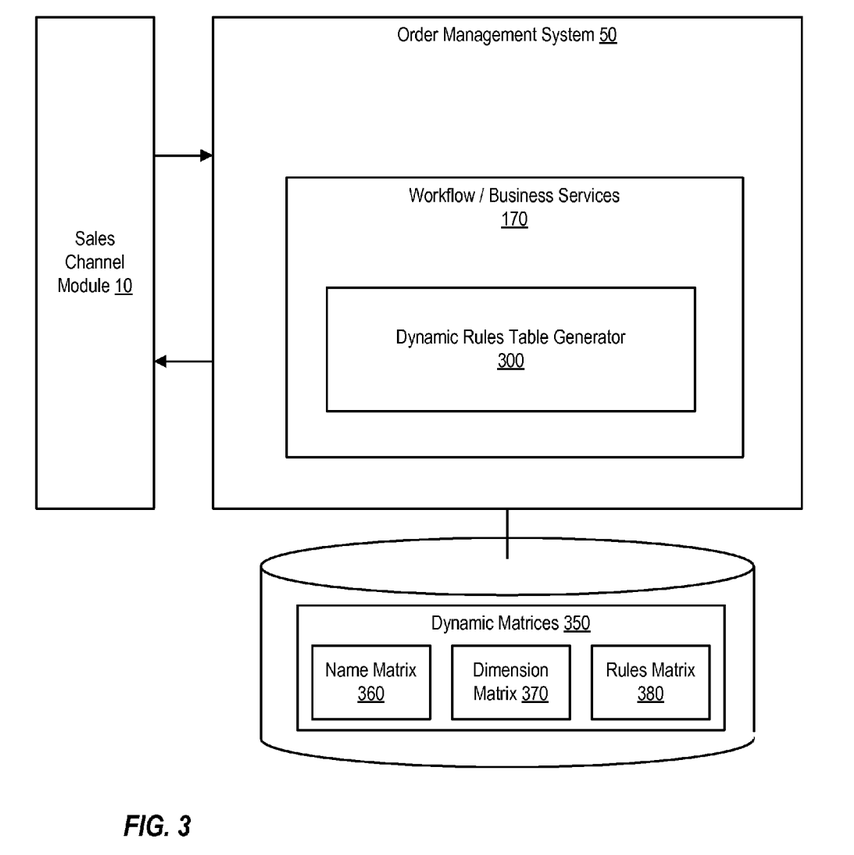
FIG. 3 is a block diagram of a system that provides a Web Services interface to access a dynamically-generated table of rules information, according to one embodiment of the present invention.

FIG. 3 is a block diagram of an order management system that provides a Web Services interface to dynamically-generated rules tables. Each rules table includes rules information, which encodes various policies for determining product pricing, eligibility, configuration, and the like. As shown, order management system 50 communicates with one or more sales channel modules 10 (e.g., one of sales channel modules 10(1)-10(4) of FIG. 1) via a Web Services interface. Order management system 50 includes one or more workflows and/or business services 170, which in turn include a dynamic rules table generator 300. Dynamic rules table generator 300 is configured to dynamically generate a table of rules information, based upon information stored in rules matrices 350.

Sales channel module 10 can request access to a rules table from order management system 50 as a service. In particular, sales channel module 10 can send a Web Service request to order management system 50 in order to request a particular rules table. The Web Service request can optionally include information identifying a sales context (e.g., such information can include a customer or account identifier, information about the status and/or location of a customer, shopping cart information, and the like) and/or a search string. Information included in the Web Service request can be translated into an appropriate data object to be processed by dynamic rules table generator 300 (e.g., by translating the Web Service request, as discussed above).

Sales channel module 10 can also request access to a rules table indirectly by invoking a workflow or business procedure that depends upon the rules table. In such situations, sales channel module 10 can send a Web Service request to invoke the desired workflow or business service, and the specified workflow or business service can encode or otherwise indicate the needed rules table. Alternatively, the Web Service request invoking the desired workflow or business service can also identify or otherwise indicate the rules table to be used by that workflow or business service.

Here, rules matrices 350 store information encoding the policies implemented by an organization. The system shown in FIG. 3 is configured to dynamically generate tables of rules information from rules matrices 350. These dynamically generated tables of rules information can be accessed as a Web Service by sales channel modules in different sales channels. Accordingly, different sales channels have access to the same rules information. Any change made to the rules information will be propagated to all sales channels that request the rules information via the Web Service interface. Accordingly, changes will be consistent across sales channels. Furthermore, changes will be propagated at the same time, such that as soon as a change is made, the updated rules table will be returned to any sales channel module that requests access to the rules table, regardless of which sales channel includes that module.

One type of rules information is price adjustment information. In many industries, price adjustments (e.g., discounts) often depend on both the product that is being sold and the sales context (e.g., such as customer and market conditions) of the sale. A company can set up one or more discount tables that specify how to tailor prices and adjustments to specific customer and market segments. These tables allow the company to create and manage prices and adjustments for products in conjunction with other customer and market factors.

For example, a company that sells laptop computers can create a discount table that allows it to charge a different price for laptops based on customer account type and sales region. In this example, customer account type, product, and sales region are the criteria for the price or discount. Therefore, the columns of the table would be Product, Account Type, Sales Region, Adjustment Type, Adjustment Amount, and the like. Each row of the table defines the price or discount that will be applied when a given product is sold to a given account type in a given sales region, as shown below:

| Product | Account Type | Sales Region | Adjustment Type | Adjustment Amount |
|---|---|---|---|---|
| Laptop 2000 | Platinum | Europe | % Discount | 10 |
| Laptop 2000 | Gold | Europe | % Discount | 5 |
| Laptop 2000 | Platinum | Asia | % Discount | 11 |
| Laptop 2000 | Gold | Asia | % Discount | 6 |

As shown, this table includes three criteria (product, account type, and sales region) for selecting a particular result (specified as an adjustment type and adjustment amount). Four different combinations of these criteria and results are specified in this table. Historically, rules have been maintained in static tables having a fixed number of rows and columns. This has limited the ability to easily add or delete rules information. For example, it may difficult to modify the size of the above table beyond four rows and six columns, after the table has been created.

To provide a more flexible system for maintaining rules, the system shown in FIG. 3 maintains rules information in a dynamic matrix that can continue to grow as new rules information is created. In other words, additional rows and/or columns for new criteria and results can be added after the initial creation of the dynamic matrix, and existing rows and/or columns may be modified or deleted if certain types of criteria or results are renamed or no longer used.

Furthermore, information for multiple different rules tables can be maintained in this dynamic matrix. Thus, instead of having a single table for each type of rules, a single matrix can store the information making up multiple such rules tables.

To provide users with access to rules in the table format to which they are accustomed, dynamic rules table generator 300 is configured to dynamically generate a single rules table, based upon the underlying dynamic matrix. Order management system 50 can then return that table to the requester as part of a Web Service response, if requested by the user. Alternatively, a workflow or business service within order management system 50 can process the dynamically generated rules table and then return a result that is based upon that processing to the requester.

Dynamic matrices 350 include one or more dynamic matrices that store all of the actual information used to populate a rules table. In some embodiments, a single dynamic matrix is maintained. In such embodiments, a "table name" column in that matrix can be used to store information identifying the table in which the information within the corresponding row is included. Accordingly, generating a particular rules table can involve searching for all of the rows in which the value of the "table name" column equals the name of the particular table being dynamically constructed. All of the matching rows can then be inserted into the dynamically generated rules table.

In other embodiments, like the one shown in FIG. 3, dynamic matrices 350 include multiple matrices. One matrix is rules matrix 380, which stores rules information for multiple different rules tables. Another matrix, called the dimension matrix 370, stores the dimensions (e.g., in terms of input criteria and results) of each rules table. This dimension matrix can be used to map information in a particular rules table to information in rules matrix 380. Yet another matrix, called name matrix 360 can store the name of each rules table and indicate where the dimensions for that rules table can be found in dimensions matrix 370. Accordingly, dynamic rules table generator 300 can search name matrix 360 for the name of the rules table being requested. If the name is found in name matrix 360, dynamic rules table generator 300 can obtain the location of the requested rules table's dimensions in the dimension matrix 370.

There can be multiple sets of rules matrices and/or dynamic matrices. For example, in one embodiment, the dimension matrix can also identify one of several rules matrices (e.g., one for each of several product lines), in addition to identifying particular criteria and results within that rules matrix. Alternatively, several sets of rules matrices 350 could be maintained (e.g., one for each marketing region).

Dynamic rules table generator 300 can then access the identified location in dimension matrix 370 to obtain the dimensions of the rules table and to obtain the location, within rules matrix 380, of the information needed to populate the dynamically generated rules table. Dynamic rules table generator 300 can then generate a rules table having the identified dimensions and contents.

The dimensions of a given rules table identify the criteria used to evaluate each rule, as well as the name and location (e.g., within rules matrix 380) of the current value of each criteria. The dimensions also identify the results by name and location (e.g., within the first dynamic matrix). Additionally, the dimensions can indicate where a particular value of each criterion can be found within a property set and/or Web Service request. This information can be used to actually apply the information in a rules table to a particular scenario. For example, a property set (e.g., as obtained by Web Service module 150 of FIG. 2 converting a Web Service request into a property set) describing a current sales context can be provided to order management module 50. The value of a particular criterion can be located within the property set, and this value can then be used to select the appropriate rule to apply to that scenario from the rules table generated by rules table generator 300.

In one embodiment, dynamic rules table generator 300 provides a user interface to allow users to create rules tables. Based upon the information entered by the user, dynamic rules table generator 300 can store the entered rules information in rule matrix 380 within a dynamic matrix and create the appropriate mapping information to be stored in name matrix 360 and dimension matrix 370. The mapping information can later be used to dynamically recreate the table that was entered by the user. This user interface can be accessed as a Web Service.

The rules table created by dynamic rules table generator 300 can be accessed as a Web Service. In other words, a sales module can request a rules table by sending a Web Service request indicating the request for the rules table to order management system 50. In response to this request, dynamic rules table generator 300 can dynamically generate the requested rules table from the information in rules matrices 350. The resulting rules table can then be encoded in a Web Service response by order management system 50 (e.g., by translating a property set containing the rules table into a Web Service response, as described above) and that Web Service response can be returned to the requesting sales channel module.

In some embodiments, the application (e.g., the sales channel module) requesting the rules table is configured to cache the rules table (e.g., by storing the dynamically generated rules table in memory and/or on disk for the duration of a session), so that the rules table does not need to be recreated each time it is accessed. Alternatively (or additionally) dynamic rules table generator 300 can be configured to cache the rules table (e.g., by storing the dynamically generated rules table in memory and/or on disk for the duration of a session). In the latter situation, dynamic rules table generator 300 is configured to cache the rules table until a modification to the underlying dynamic matrices is detected.

Figure 4:
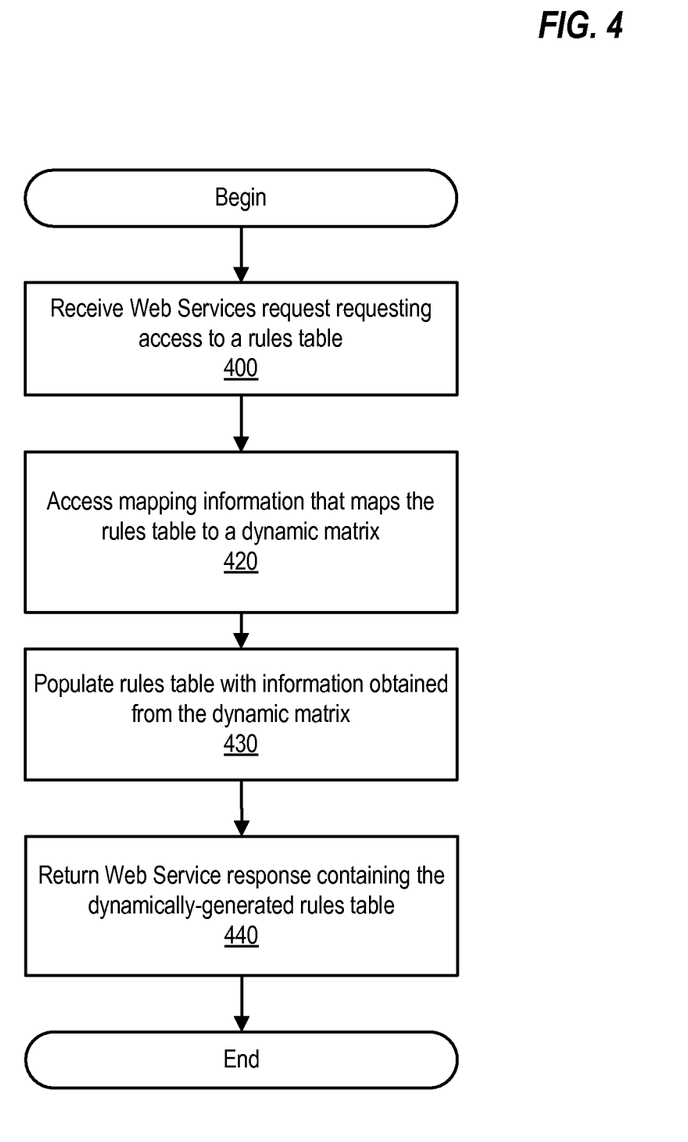
FIG. 4 is a flowchart of a method of providing a dynamically-generated table of rules information as a service, according to one embodiment of the present invention.

FIG. 4 is a flowchart of a method of providing a dynamically-generated table of rules information as a service. The method begins at 400, when a Web Service request requesting access to a rules table is received. In response, mapping information that maps the information in the rules table to a dynamic matrix is accessed, as shown at 420. In one embodiment, this mapping information can be obtained from a name matrix, which maps each of several tables to a dimensions matrix. Mapping information can also and/or alternatively be obtained from a dimensions matrix, which can specify the dimensions of each of several tables.

A table having the dimensions obtained from the mapping information can then be created, and this table can be populated with information obtained from the dynamic matrix using the mapping information, as shown at 430. A Web Service response containing the rules table created at 430 can then be returned to the requesting application, as shown at 440. Alternatively and/or additionally, this dynamically generated rules table 430 can be returned to an workflow or business process within the same system as the module performing the table generation.

Figure 5:
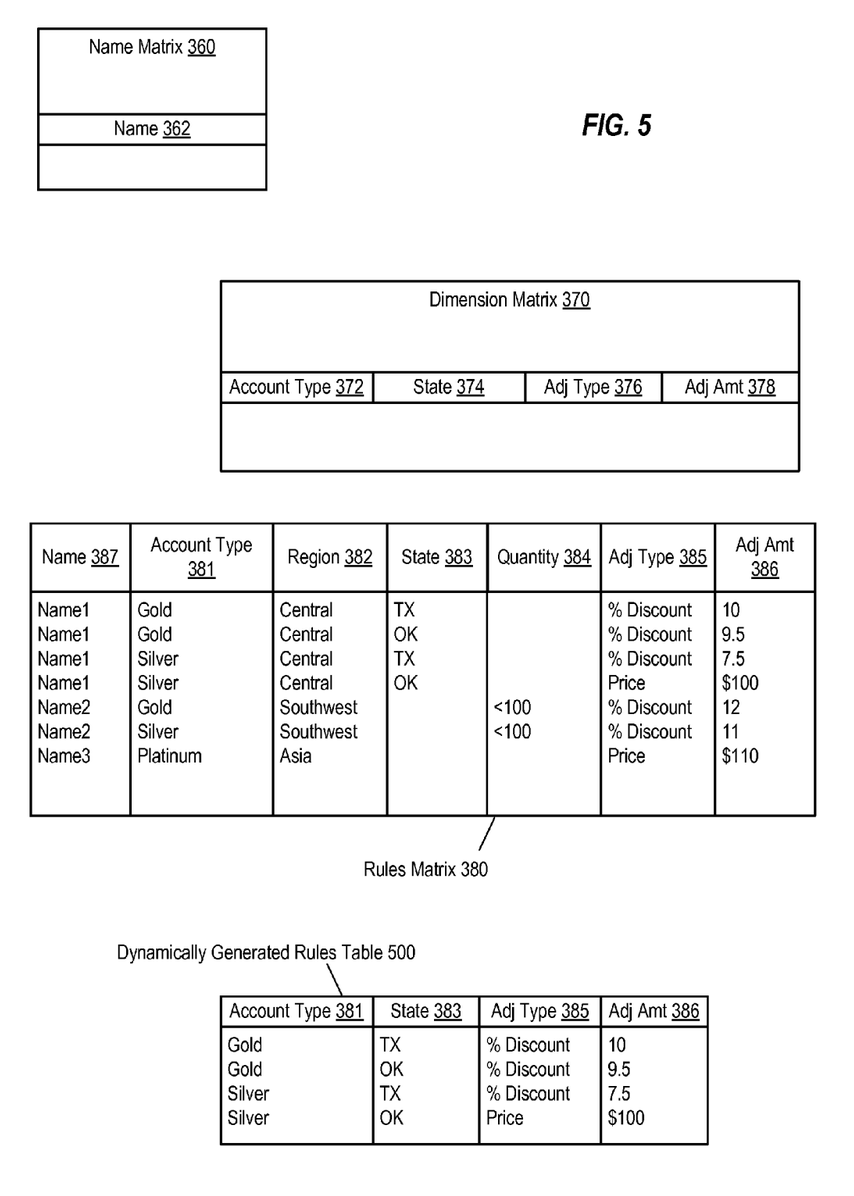
FIG. 5 is a block diagram of a set of rules matrices, according to one embodiment of the present invention.

FIG. 5 illustrates an example of a set of dynamic matrices and a dynamically generated rules table 500 constructed from information stored in the dynamic matrices. As shown in this example, name matrix 360 stores one or more names, such as name 362. In this example, name 362 is the value "Name1". Each name can be stored in a different row of name matrix 360. Whenever a dynamic rules generation module wants to generate a new rules table, the module can search name matrix 360 for the matching name.

The row of name matrix 360 that contains the matching name indicates the particular row in dimension matrix 370 that stores the dimensions of the desired rules table. In some embodiments, the position of the matching row in name matrix 360 indicates the position of the desired row in dimension matrix 370 (e.g., if the matching row in name matrix 360 is the 62nd row in name matrix 360, it indicates that the desired row in dimension matrix 370 is the 62nd row in dimension matrix 370). Alternatively, the matching row in name matrix 360 can include a pointer or other reference to the desired row of dimension matrix 370. In still other embodiments, the matching row in dimension matrix 370 can be identified by searching a particular column of dimension matrix 370 for the matching name.

Dimension matrix 370 includes multiple rows, each of which stores the dimensions of a particular rules table. A single such row is shown in FIG. 5. This row indicates that the dimensions of a rules table (e.g., the rules tabled identified by name 362 of name matrix 360) include two criteria (account type 372 and state 374) and two results (adjustment "adj" type 376 and adjustment "adj" amount "amt" 378).

Alternatively, instead of including a single row per table, dimension matrix 370 can store multiple rows (e.g., one for each dimension) for each table identified by name matrix 360. Thus, for a table like the one being described in this example, which has four dimensions, the dimension matrix can include four rows. Each row can identify a particular dimension as well as the table (e.g., by name, such as "Name1") to which that dimension corresponds.

Dimension matrix 370 can also include information (not shown) that maps each dimension to a particular property of a property set and/or field of a Web Service request. For example, the field storing account type 372 dimension can also store information indicating that the value of this input criteria can be found at the property identified as "Context.AccountType" within a context property set. As noted above, additional information (e.g., such as a table name, which matches one of the names stored in name matrix 360) can also be stored (e.g., in a separate column) in each row of dimension matrix 370.

Rules matrix 380 stores rules information for multiple different rules tables. As shown, rules matrix 380 includes seven columns: name 387, account type 381, region 382, state 383, quantity 384, adjustment "adj" type 385, and adjustment "adj" amount 386. Several rows are also included. The name column stores the name of the table in which the information in each row is included. Thus, the first four rows are part of table "Name1", the next two rows are part of table "Name2", and the last row is part of table "Name3". These table names can also be stored in name matrix 360 and/or dimension matrix 370, as described above.

In order to dynamically generate the rules table having the dimensions identified in the illustrated row of dimension matrix 370, a module can select the columns of rules matrix 380 indicated as being the dimensions of the table by dimensions matrix 370 and the rows indicated as being part of the table by name matrix 360. Accordingly, since the dimension matrix row identifies account type, state, adjustment type, and adjustment amount, at least a portion of each of columns 381, 383, 385, and 386 will be included in the resulting results table.

Furthermore, the name "Name1" (as specified in row 362 of name matrix 360) is contained in the first four rows. In contrast, the fifth, sixth, and seventh rows of rules matrix 380 store names other than "Name1". Accordingly, these last three rows will not be included in the resulting rules table.

Accordingly, the rules table generated by the dynamic rules table generation module based upon the content of rules matrix 380, the name specified by name matrix 360, and the dimensions specified in the illustrated row of dimension matrix 370 will look like dynamically generated rules table 500, which has the specified dimensions and the content corresponding to those dimensions obtained from rules matrix 380. As shown, rules table 500 includes four columns and four rows. The selected columns correspond to the criteria and results specified in the dimension matrix. The selected rows correspond to name specified in the name matrix.

In one embodiment, instead of having a dedicated column for each specific dimension (e.g., such as account type), rules matrix 370 includes many columns of fairly generic types (e.g., number columns for storing numerical data, string columns for storing alphanumeric strings, date columns for storing time and/or date information, and the like). Different tables can effectively interpret the same one of these columns differently (i.e., the same column can have a different meaning, depending upon which table it is included in). For example, a generic string column can be used by two different tables. One table can use this string column as a "Account Type" dimension to indicate one of several different types of accounts. Another table can use this date column as a "Product Name" dimension to indicate the name of a particular product.

It is noted that new tables can be created in a set of matrices like those shown in FIG. 5 without affecting any existing tables. For each new table, at least one row can be added to each of the name and dimension matrices. A number of rows equal to the number of rows in the new table can be added to the rules matrix. If the new table includes a dimension that has not been included in prior tables, information identifying that dimension can be stored in the row of the dimension table that corresponds to the new table, while a new column representing that dimension can be added to the rules matrix (or a preexisting generic column, like those described above, can be used to represent that dimension of the new table).

Similarly, existing tables can be modified without affecting existing tables. A change to a value in one table will not affect any other table, since tables can be maintained independently (through the use of different sets of rows for each table in the rules matrix) of each other.

While the above description has focused on a Web Service architecture for dynamic rules generation in the order management context, and specifically for determining pricing policies to apply, the same or similar architecture can be used in other contexts. Within the order management context, for example, such a rules table generator can be used to generate rules tables for eligibility and/or configuration. Similarly, other systems that maintain rules in multiple different tables can implement a similar architecture in order to provide increased flexibility of storage of and/or improved access to their rules table.

Figure 6:
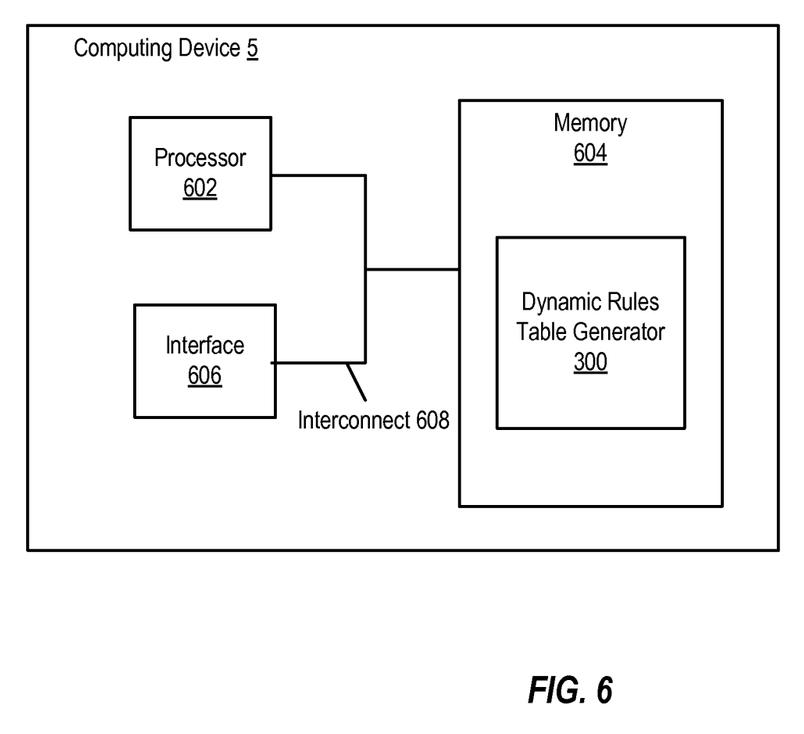
FIG. 6 is a block diagram of a computing device that illustrates how an order management system that provides a Web Services interface can be implemented in software, according to one embodiment of the present invention.

FIG. 6 is a block diagram of a computing device that illustrates how a dynamic rules table generator 300 that provides a Web Services interface can be implemented in software. FIG. 6 is a block diagram of a computing device 5 (e.g., one of computing devices 5(1)-5(5) of FIG. 1) that implements all or part of a dynamic rules table generator 300. While the illustrated example shows a single module executing on a single computing device, it is noted that in alternative embodiments, the functionality included within a dynamic rules table generator 300 can be subdivided among multiple modules, each of which may be implemented on a separate computing device.

Computing device 5 can be a personal computer, network appliance, server, personal digital assistant, mobile phone, storage controller (e.g., an array controller, tape drive controller, or hard drive controller), or the like. As illustrated, computing device 5 includes one or more processors 602 (e.g., microprocessors, Programmable Logic Devices (PLDs), or Application Specific Integrated Circuits (ASICs)) configured to execute program instructions stored in memory 604. Memory 604 can include various types of RAM (Random Access Memory), Read Only Memory (ROM), Flash memory, Micro Electro-Mechanical Systems (MEMS) memory, magnetic core memory, and the like. Memory 604 can include both volatile and non-volatile memory. Computing device 5 also includes one or more interfaces 606. Processor 602, interface 606, and memory 604 are coupled to send and receive data and control signals by a bus or other interconnect.

Interface 606 can include a network interface to various networks and/or interfaces to various peripheral buses. For example, interface 606 can include a network interface via which a dynamic rules table generator 300 (or an order management system in which dynamic rules table generator 300 is included) sends and receives Web Service requests and/or responses. Interface 606 can also include an interface to one or more storage devices. For example, order management system 50 can access dynamic matrices stored on such a storage device.

In this example, program instructions and data executable to implement all or part of a dynamic rules table generator 300 are stored in various computer readable storage media such as memory 604. In some embodiments, such software is stored on a computer readable storage medium such as a Compact Disc (CD), Digital Versatile Disc (DVD), hard disk, optical disk, tape device, floppy disk, and the like). In order to be executed by processor 602, the instructions and data can be loaded into memory 604 from the other computer readable storage medium. The instructions and/or data can also be transferred to computing device 5 for storage in memory 604 via a network such as the Internet or upon a carrier medium.

The flowcharts provided here are provided as examples, and it is noted that other embodiments can include different operations instead of and/or in addition to those shown in the flowcharts presented herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a Web Service request from a requester via a network; and
   dynamically generating a rules table, in response to the Web Service request, wherein the dynamically generating the rules table comprises
      accessing a dimensions matrix,
      identifying, based at least in part on the dimensions matrix, locations within a rules matrix of information relevant to the Web Service request;
      accessing a rules matrix, wherein
         the rules matrix stores information associated with a plurality of rules, and
         the receiving and the dynamically generating are performed by a computing device implementing a dynamic rules table generator,
      determining, from the rules matrix,
         one or more input criteria associated with the plurality of rules, and
         one or more results categories associated with the plurality of rules,
      selecting a plurality of policies from the rules matrix, wherein
         the plurality of policies are configured to determine a plurality of prices of a product, and
      storing the plurality of policies in the rules table.

2. The method of claim 1, wherein the Web Service request comprises a request for the rules table, wherein the method further comprises sending a Web Service response to the requester, and wherein the Web Service response comprises the rules table.

3. The method of claim 2, further comprising the requester caching the rules table, in response to receiving the Web Service response.

4. The method of claim 1, wherein the requester comprises a sales channel module in a first sales channel, and wherein the method further comprises:
   receiving a second Web Service request from a second requester in a second sales channel; and
   regenerating the rules table, in response to receipt of the second Web Service request.

5. The method of claim 1, further comprising:
   receiving a second Web Service request, wherein the second Web Service request comprises a request to modify the rules table; and
   modifying the rules matrix, in response to receipt of the second Web Service request.

6. The method of claim 1, wherein the dynamically generating the rules table comprises:
   storing the information from the rules matrix in the rules table.

7. The method of claim 1, wherein:
   the rules matrix is distinct from the dimensions matrix; and
   the rules table comprises a plurality of rules relating to a product.

8. The method of claim 1, further comprising:
   sending a Web Service response to the requester, wherein the Web Service response comprises the rules table;
   the requester caching the rules table, in response to receiving the Web Service response;
   receiving a second Web Service request, wherein the second Web Service request comprises a request to modify the rules table; and
   modifying the rules matrix, in response to receipt of the second Web Service request, wherein
      the information identifying the one or more input criteria identifies a location of each of the one or more input criteria in a property set.

9. The method of claim 1, further comprising:
   maintaining a copy of the rules table, subsequent to the dynamically generating the rules table; and
   invalidating the copy of the rules table, in response to detecting a modification of the rules matrix.

10. The method of claim 1, wherein:
    the plurality of policies correspond to the one or more input criteria and the one or more results categories.

11. A non-transitory computer readable storage medium storing program instructions executable to:
    receive a Web Service request from a requester via a network; and
    dynamically generate a rules table, in response to the Web Service request from the requester, wherein the dynamically generating the rules table comprises
       identifying, based at least in part on a dimensions matrix, locations within a rules matrix of information relevant to the Web Service request,
       accessing a rules matrix, wherein
          the rules matrix stores information associated with a plurality of rules,
       determining, from the rules matrix,
          one or more input criteria associated with the plurality of rules, and
          one or more results categories associated with the plurality of rules,
       selecting a plurality of policies from the rules matrix, wherein
          the plurality of policies are configured to determine a plurality of prices of a product, and
       storing the plurality of policies in the rules table.

12. The non-transitory computer-readable storage medium of claim 11, wherein the Web Service request comprises a request for the rules table, wherein the program instructions are further executable to send a Web Service response to the requester, and wherein the Web Service response comprises the rules table.

13. The non-transitory computer-readable storage medium of claim 11, wherein the requester comprises a sales channel module in a first sales channel, and wherein the program instructions are further executable to:
    regenerate the rules table, in response to receipt of a second Web Service request from a second requester in a second sales channel.

14. The non-transitory computer-readable storage medium of claim 11, wherein the program instructions are further executable to:
    modify the rules matrix, in response to receipt of a second Web Service request, wherein the second Web Service request comprises a request to modify the rules table.

15. The non-transitory computer-readable storage medium of claim 11, wherein the program instructions are executable to:
store the information from the rules matrix in the rules table.

16. The non-transitory computer-readable storage medium of claim 11, wherein the program instructions are further executable to access a name matrix, wherein the name matrix indicates a row of the dimensions matrix storing information identifying the one or more input criteria and the one or more results categories included in the rules table.

17. The non-transitory computer-readable storage medium of claim 11, wherein information identifying the one or more input criteria identifies a location of each of the one or more input criteria in a property set.

18. The non-transitory computer-readable storage medium of claim 11, wherein the program instructions are further executable to:
maintain a copy of the rules table, subsequent to dynamically generating the rules table; and
invalidate the copy of the rules table, in response to detecting a modification of the rules matrix.

19. A system comprising:
non-transitory computer readable storage means for storing one or more rules matrices; and
dynamic rules table generation means for dynamically generating a rules table, in response to a Web Service request from a requester, wherein dynamically generating the rules table comprises
identifying, based at least in part on a dimensions matrix, locations within a rules matrix of information relevant to the Web Service request,
accessing a rules matrix, wherein
the rules matrix stores information associated with a plurality of rules,
determining, from the rules matrix,
one or more input criteria associated with the plurality of rules, and
one or more results categories associated with the plurality of rules,
selecting a plurality of policies from the rules matrix, wherein
the plurality of policies are configured to determine a plurality of prices of a product, and
storing the plurality of policies in the rules table.

20. The system of claim 19, wherein the Web Service request comprises a request for the rules table, wherein the dynamic rules table generation means comprise means for sending a Web Service response to the requester, and wherein the Web Service response comprises the rules table.

21. The system of claim 19, wherein the dynamic rules table generation means comprise means for modifying the rules matrix, in response to receipt of a second Web Service request, wherein the second Web Service request comprises a request to modify the rules table.

22. The system of claim 19, wherein the dynamic rules table generation means comprises means for accessing a name matrix, wherein the name matrix indicates a row of the dimensions matrix storing information identifying the one or more input criteria and the one or more results included in the rules table.

* * * * *

UNITED STATES PATENT AND TRADEMARK OFFICE
CERTIFICATE OF CORRECTION

PATENT NO. : 8,996,606 B2  
APPLICATION NO. : 12/254770  
DATED : March 31, 2015  
INVENTOR(S) : Seaman, II et al.

It is certified that error appears in the above-identified patent and that said Letters Patent is hereby corrected as shown below:

In Title page, Item (56), column 2, under other publications, line 4, delete "search,proquest" and insert -- search.proquest --, therefor.

In the Specification

In column 10, line 60, delete "computer readable" and insert -- computer-readable --, therefor.

In column 10, line 62, delete "computer readable" and insert -- computer-readable --, therefor.

In column 10, line 66, delete "computer readable" and insert -- computer-readable --, therefor.

In the Claims

In column 12, line 25, in claim 11, delete "computer readable" and insert -- computer-readable --, therefor.

In column 13, line 23, in claim 19, delete "computer readable" and insert -- computer-readable --, therefor.

Signed and Sealed this  
Third Day of November, 2015

Michelle K. Lee  
*Director of the United States Patent and Trademark Office*